United States Patent
Matsuda

(10) Patent No.: US 12,013,991 B2
(45) Date of Patent: Jun. 18, 2024

(54) DETECTION METHOD OF PEN SIGNAL, SENSOR CONTROLLER, AND POSITION DETECTION SYSTEM

(71) Applicant: Wacom Co., Ltd., Saitama (JP)

(72) Inventor: Yosuke Matsuda, Saitama (JP)

(73) Assignee: Wacom Co., Ltd., Saitama (JP)

( * ) Notice: Subject to any disclaimer, the term of this patent is extended or adjusted under 35 U.S.C. 154(b) by 0 days.

(21) Appl. No.: 18/451,040

(22) Filed: Aug. 16, 2023

(65) Prior Publication Data

US 2023/0393673 A1 Dec. 7, 2023

Related U.S. Application Data

(63) Continuation of application No. PCT/JP2021/028068, filed on Jul. 29, 2021.

(51) Int. Cl.
*G06F 3/0354* (2013.01)
*G06F 3/041* (2006.01)
*G06F 3/044* (2006.01)

(52) U.S. Cl.
CPC ...... *G06F 3/03545* (2013.01); *G06F 3/04184* (2019.05); *G06F 3/0441* (2019.05)

(58) Field of Classification Search
USPC ......................................................... 345/179
See application file for complete search history.

(56) References Cited

U.S. PATENT DOCUMENTS

| | | | |
|---|---|---|---|
| 10,719,145 B1 * | 7/2020 | Files | G06F 1/169 |
| 11,467,692 B2 * | 10/2022 | Kim | G06F 3/04166 |
| 11,561,642 B2 * | 1/2023 | Jang | G06F 3/04162 |
| 2004/0039545 A1 * | 2/2004 | Katsurahira | G06F 3/046 702/150 |
| 2012/0119990 A1 * | 5/2012 | Liu | G06F 3/03545 345/158 |

(Continued)

FOREIGN PATENT DOCUMENTS

| | | |
|---|---|---|
| EP | 0571230 A1 | 11/1993 |
| EP | 0684580 A2 | 11/1995 |

(Continued)

OTHER PUBLICATIONS

International Search Report dated Sep. 7, 2021, for corresponding International Application PCT/JP2021/028068 filed Jul. 29, 2021, 2 pages (English Translation).

*Primary Examiner* — Chineyere D Wills-Burns
(74) *Attorney, Agent, or Firm* — Seed IP Law Group LLP

(57) ABSTRACT

A detection method of a pen signal that is an alternating current signal sent from a pen according to the present disclosure includes setting a first detection period and a second detection period that is the period after the first detection period ends based on a generation cycle of noise, transmitting to the pen an uplink signal requesting transmission of the pen signal in synchronization with the first detection period and transmission of the pen signal, whose phase is inverted with respect to the pen signal transmitted in synchronization with the first detection period, in synchronization with the second detection period, and acquiring the pen signal based on a first received signal received from the pen in the first detection period and a second received signal received from the pen in the second detection period.

13 Claims, 5 Drawing Sheets

(56) References Cited

U.S. PATENT DOCUMENTS

| | | | |
|---|---|---|---|
| 2013/0057511 A1* | 3/2013 | Shepelev | G06F 3/0412 345/174 |
| 2013/0207925 A1* | 8/2013 | Ryshtun | G06F 3/0446 345/174 |
| 2016/0378265 A1* | 12/2016 | Katsurahira | G06F 3/0442 345/174 |
| 2017/0285772 A1* | 10/2017 | Yamamoto | G06F 3/0442 |
| 2018/0046269 A1* | 2/2018 | Kaplan | G06F 1/3259 |
| 2018/0113519 A1* | 4/2018 | Yamamoto | G06F 3/0412 |
| 2018/0113523 A1* | 4/2018 | Hara | G06F 3/0446 |
| 2018/0188832 A1* | 7/2018 | Coppin | G06F 3/0446 |
| 2020/0159342 A1* | 5/2020 | Gray | G06F 3/0416 |
| 2020/0174589 A1* | 6/2020 | Hara | G06F 3/04162 |
| 2020/0210045 A1 | 7/2020 | Mohamed et al. | |
| 2020/0363892 A1* | 11/2020 | Kim | G06F 3/0354 |
| 2021/0405174 A1* | 12/2021 | Kerner | G06F 3/03545 |

FOREIGN PATENT DOCUMENTS

| | | |
|---|---|---|
| JP | H0736601 A | 2/1995 |
| JP | 2003067124 A | 3/2003 |
| WO | 2015/141349 A1 | 9/2015 |

\* cited by examiner

DETECTION METHOD OF PEN SIGNAL, SENSOR CONTROLLER, AND POSITION DETECTION SYSTEM

BACKGROUND

Technical Field

The present disclosure relates to a detection method of a pen signal, a sensor controller, and a position detection system, and particularly to a detection method of a pen signal under an environment where periodic noise is generated, and to a sensor controller and a position detection system for detecting such a pen signal.

Description of the Related Art

In a touch detection device of a type in which a display and a touch sensor are arranged while being superimposed, generation of noise derived from a horizontal synchronization (HSYNC) pulse that is an internal signal of the display has been known. Hereinafter, this noise will be referred to as "HSYNC noise."

Patent Literature 1 discloses an example of a touch detection device in which the HSYNC noise is generated. In the touch detection device described in the literature, a pulse synchronized with a horizontal synchronous pulse is generated, and the input to a reception circuit is interrupted at a timing synchronized with the pulse, so that influence of the HSYNC noise on position detection can be reduced.

PRIOR ART DOCUMENT

Patent Document

Patent Document 1: PCT Patent Publication No. WO 2015-141349

BRIEF SUMMARY

Technical Problem

However, in recent years, a resolution of displays has become higher, and a cycle of the horizontal synchronous pulse has become extremely short. In one example, a 4K display, for example, generates horizontal synchronous pulses with a cycle of approximately 2000 times per second. Then, if the input to the reception circuit is interrupted at a timing synchronized with the horizontal synchronization pulse as in Patent Literature 1, the period in which a pen signal can be detected by the reception circuit becomes extremely short. As a result, the signal-to-noise ratio (hereinafter, referred to as "S/N ratio") of the pen signal is decreased even though the HSYNC noise is not input to the reception circuit.

Embodiments of the present disclosure provide a detection method of a pen signal, a sensor controller, and a position detection system that can avoid a decrease in an S/N ratio of a pen signal even in the case where a high-resolution display is used.

Technical Solution

A detection method of a pen signal that is an alternating current signal sent from a pen according to the present disclosure includes setting a first detection period and a second detection period that is a period after the first detection period ends based on a generation cycle of noise, transmitting to the pen a transmission request signal requesting transmission of the pen signal in synchronization with the first detection period and transmission of the pen signal, whose phase is inverted with respect to the pen signal transmitted in synchronization with the first detection period, in synchronization with the second detection period, and acquiring the pen signal based on a first received signal received from the pen in the first detection period and a second received signal received from the pen in the second detection period.

A sensor controller for detecting a pen signal that is an alternating current signal sent from a pen according to the present disclosure includes a transmitter that, in operation, supplies a transmission request signal to a sensor, a receiver that, in operation, receives a signal arriving at the sensor, and a processor that, in operation, controls the transmitter and the receiver, in which the processor, in operation: sets a first detection period and a second detection period that is a period after the first detection period ends based on a generation cycle of noise, transmits to the pen, via the transmitter, a transmission request signal requesting transmission of the pen signal in synchronization with the first detection period and transmission of the pen signal, whose phase is inverted with respect to the pen signal transmitted in synchronization with the first detection period, in synchronization with the second detection period, and acquires the pen signal based on a first received signal output from the receiver in the first detection period and a second received signal output from the receiver in the second detection period.

A position detection system according to the present disclosure includes a pen and a sensor controller that, in operation, detects a pen signal that is an alternating current signal sent from the pen, in which the sensor controller includes a transmitter that, in operation, supplies a transmission request signal to a sensor, a receiver that, in operation, receives a signal arriving at the sensor, and a processor that, in operation, controls the transmitter and the receiver, in which the processor, in operation: sets a first detection period and a second detection period that is a period after the first detection period ends based on the generation cycle of noise, transmits to the pen, via the transmitter, a transmission request signal requesting transmission of the pen signal in synchronization with the first detection period and transmission of the pen signal, whose phase is inverted with respect to the pen signal transmitted in synchronization with the first detection period, in synchronization with the second detection period, and acquires the pen signal based on a first received signal output from the receiver in the first detection period and a second received signal output from the receiver in the second detection period.

Advantageous Effects

According to the present disclosure, the noise can be canceled while leaving the pen signal, and thus the noise can be removed from the pen signal without interrupting the input to the reception circuit. Therefore, even in the case where a high-resolution display is used, it is possible to avoid a decrease in the S/N ratio of the pen signal.

DETAILED DESCRIPTION

Hereinafter, preferred embodiments of the present disclosure will be described in detail with reference to the attached drawings.

Figure 1:
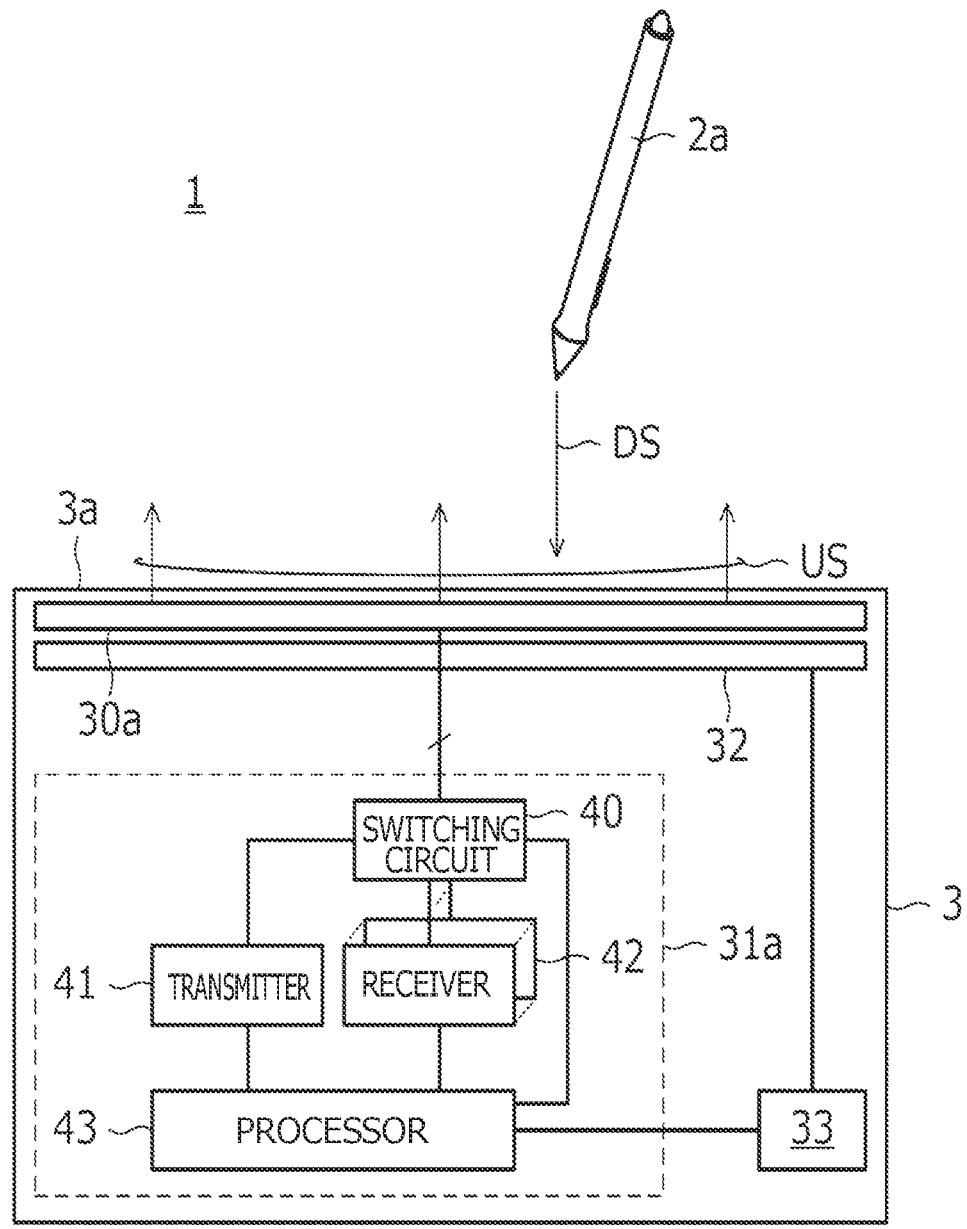
FIG. 1 is a diagram for depicting a configuration of a position detection system 1 according to a first embodiment of the present disclosure.

FIG. 1 is a diagram for depicting a configuration of a position detection system 1 according to a first embodiment of the present disclosure. As depicted in the drawing, the position detection system 1 includes a pen 2a configured to an active capacitive system and an electronic apparatus 3 that is a position detection device for detecting the pen 2a. As an example of the electronic apparatus 3, there is a tablet computer or a device equipped with a digitizer.

The electronic apparatus 3 has a touch surface 3a that is a flat surface, a sensor 30a arranged immediately below the touch surface 3a, a sensor controller 31a connected to the sensor 30a, a display 32 arranged while being superimposed on the sensor 30a, and a host processor 33 that controls each unit of the electronic apparatus 3 including these.

The sensor 30a is a device having a structure in which a plurality of sensor electrodes, each of which is a uniform or mesh-like conductor, is arranged in the touch surface 3a. The plurality of sensor electrodes includes a plurality of X electrodes each of which extends in the y direction parallel to the touch surface 3a and is arranged at equal intervals in the x direction perpendicular to the y direction in the touch surface 3a, and a plurality of Y electrodes each of which extends in the x direction and is arranged at equal intervals in the y direction.

The sensor controller 31a is an integrated circuit having a function of deriving the position of the pen 2a in the touch surface 3a. Detection of the position of the pen 2a by the sensor controller 31a is executed by an active capacitive system. Specifically, the sensor controller 31a is configured to periodically transmit an uplink signal US at first. The uplink signal US in the active capacitive system is a signal that has a role of notifying the pen 2a of the timing (reference timing) as the reference of the operation and transmitting a command defining the operation of the pen 2a. The uplink signal US also has a role as a transmission request signal that requests the pen 2a to transmit a position signal (pen signal) to be described later. The transmission of the uplink signal US is executed using some or all of the plurality of sensor electrodes configuring the sensor 30a.

The pen 2a has a pen tip electrode provided at the pen tip, and detects the uplink signal US by detecting a change in the potential of the pen tip electrode. The pen 2a at the stage where the uplink signal US has not yet been detected continuously or intermittently performs an operation for detecting the uplink signal US. After the uplink signal US is once detected, the pen 2a determines a transmission/reception schedule of a downlink signal DS and the next uplink signal US on the basis of the detected uplink signal US, and executes transmission of the downlink signal DS and reception of the next uplink signal US according to the determined transmission schedule.

The downlink signal DS is a signal that includes a position signal which is an unmodulated carrier signal, and a data signal obtained by modulating the carrier signal with predetermined data such as a pen pressure value or data requested to be transmitted by a command in the uplink signal US. At the stage where the sensor controller 31a has not yet derived the position of the pen 2a, the pen 2a transmits only the position signal as the downlink signal DS. The sensor controller 31a performs a detection process of the downlink signal DS at all the sensor electrodes configuring the sensor 30a. Then, the position of the pen 2a is derived on the basis of the reception intensity of the position signal at each sensor electrode (global scan). After the sensor controller 31a derives the position of the pen 2a once in this way, the pen 2a sequentially transmits the position signal and the data signal as the downlink signal DS. The sensor controller 31a selects the predetermined number of sensor electrodes positioned in the vicinity of the previously-derived position, and performs a detection process of the position signal at the selected sensor electrodes. Then, the position of the pen 2a is updated on the basis of the reception intensity of the position signal at each sensor electrode (local scan). In addition, the sensor controller 31a selects one sensor electrode positioned in the vicinity of the previously-derived position, and performs a detection process of the data signal at the selected sensor electrode. Then, the data transmitted by the pen 2a is acquired by demodulating the detected data signal.

The sensor controller 31a is configured to sequentially supply the position derived as described above and the acquired data to the host processor 33. The host processor 33 is a central processor of the electronic apparatus 3 and is configured to be capable of executing various programs including a drawing application. The drawing application is a program that causes the host processor 33 to execute a process of generating digital ink on the basis of the position and data supplied from the sensor controller 31a and a process of storing the generated digital ink in a memory in the electronic apparatus 3 and displaying the same on the display 32.

The display 32 is a display device such as a liquid crystal display or an organic electronic (EL) display. The sensor 30a is arranged on the display surface of the display 32 while being overlapped with the display 32. A plurality of pixels is arranged in a matrix in the display surface of the display 32, and the display 32 displays a video by controlling each pixel according to a display signal supplied from the host processor 33.

The control of each pixel in the display 32 is executed by performing a process of controlling the pixels in order from one end to the other end in the line direction for each line. The timing of changing a line is defined by horizontal synchronization pulses generated periodically in the display 32. Since the horizontal synchronization pulse is a signal having a large amplitude, it is significantly superimposed on the downlink signal DS detected by the sensor controller 31a as the above-described HSYNC noise.

One of the objects of the present disclosure is to avoid a decrease in an S/N ratio of the position signal due to the HSYNC noise. That is, since the position signal is used to derive the position of the pen 2a on the basis of the reception intensity of the position signal at each sensor electrode as described above, it becomes difficult for the sensor controller 31a to correctly derive the position of the pen 2a when the reception intensity fluctuates due to the HSYNC noise. Accordingly, when executing the above-described local scan, the sensor controller 31a performs a process of setting two detection periods in which the HSYNC noise having the same content is expected to occur, causing the pen 2a to transmit the position signal in each period, and canceling the HSYNC noise while leaving the position signal by combining the signals received in the respective periods. The details thereof will be described later.

It should be noted that since the global scan does not require position detection with high accuracy as compared with the local scan, it is not subject to the above process in the embodiment. In addition, the data signal is not also subject to the above process in the embodiment because an error detection code is included in the data signal, and if an error occurs in the demodulation result due to the HSYNC noise, it can be dealt with by detection and retransmission, and moreover, the data signal needs to be acquired mainly when the pen tip of the pen 2a is in contact with the touch surface 3a (when the pen is down), and the reception intensity of the data signal is expected to be sufficiently large as compared with the HSYNC noise when the pen is down. However, the global scan and the data signal may be subject to the above process.

As depicted in FIG. 1, the sensor controller 31a has a switching unit 40, a transmitter 41, a plurality of receivers 42, and a processor 43. The switching unit 40 is a functional unit that switches the connection destination of each sensor electrode between the transmitter 41 and the plurality of receivers 42 according to the control by the processor 43. The transmitter 41 is a functional unit that supplies the uplink signal US to one or more sensor electrodes connected via the switching unit 40 according to the control by the processor 43.

Each of the plurality of receivers 42 is a functional unit that receives the downlink signal DS arriving at the sensor electrode (reception electrode) connected via the switching unit 40. Specifically, it is configured to periodically acquire the potential of the sensor electrode and output to the processor 43 time-series signals configured by using a series of potentials acquired as a result. The time-series signals are signals in which the HSYNC noise is superimposed on the downlink signal DS.

The processor 43 is a functional unit that performs the global scan of the pen 2a and the local scan of the pen 2a, and receives data from the pen 2a through the control of the switching unit 40, the transmitter 41, and each receiver 42. During the local scan process among these processes, the processor 43 executes a process of setting two detection periods in which the HSYNC noise having the same content is expected to occur, causing the pen 2a to transmit the position signal in each period, and canceling the HSYNC noise while leaving the position signal by combining the time-series signals supplied from the receiver 42 in the respective periods. Hereinafter, this point will be described in detail with reference to a processing flow of the local scan.

Figure 2:
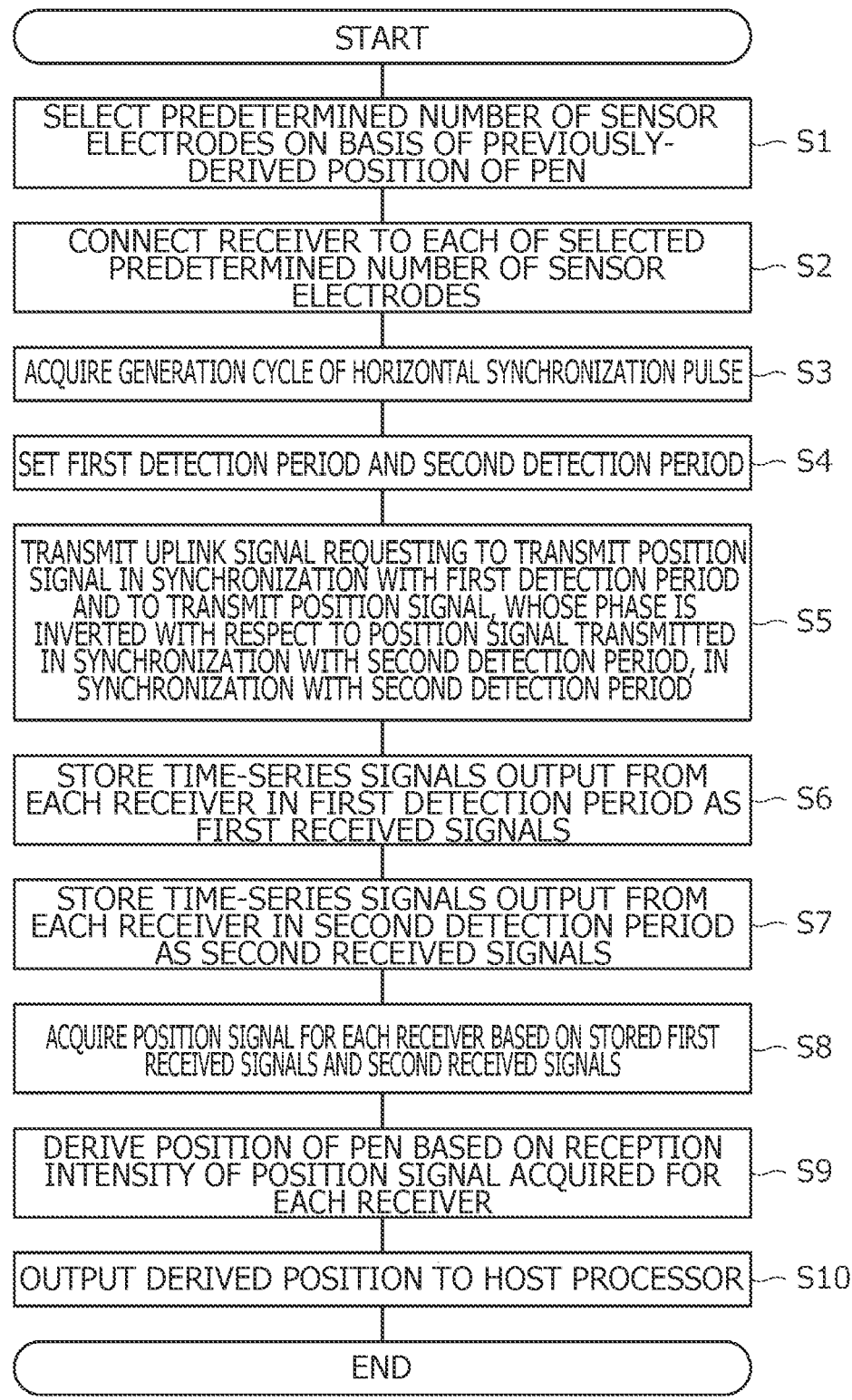
FIG. 2 is a diagram for depicting a processing flow of a local scan executed by a processor 43 depicted in FIG. 1.

FIG. 2 is a diagram for depicting the processing flow of the local scan executed by the processor 43. As depicted in the drawing, the processor 43 first selects the predetermined number of sensor electrodes on the basis of the previously-derived position of the pen 2a (S1), and connects the receiver 42 to each of the selected predetermined number of sensor electrodes (S2). At S1, the processor 43 is configured to select the X electrodes and the Y electrodes, the numbers of which are the same, in order from the one nearest to the previously-derived position of the pen 2a. In addition, the predetermined number is equal to or less than the total number of receivers 42, and the respective sensor electrodes selected at S1 are connected to the receivers 42 that are different from each other.

Next, the processor 43 acquires the generation cycle of the horizontal synchronization pulse (the generation cycle of the HSYNC noise) from the host processor 33 (S3), and sets a first detection period and a second detection period that is the period after the first detection period ends on the basis of the acquired cycle (S4). The first detection period and the second detection period are each a period having a time length that is a natural number multiple of the generation cycle of the HSYNC noise and are set to the same time length as each other. In addition, the processor 43 sets the first detection period and the second detection period so that the phases of the HSYNC noise in the respective periods substantially match each other. Here, "substantially matching" means matching within the range of fluctuation errors in the generation cycle of the HSYNC noise.

Subsequently, the processor 43 transmits the uplink signal US requesting to transmit the position signal in synchronization with the first detection period and to transmit the position signal, whose phase is inverted with respect to the position signal transmitted in synchronization with the first detection period, in synchronization with the second detection period (S5). The uplink signal US includes data indicating the elapsed time from the above-described reference timing to the start timing of each of the first detection period and the second detection period, and the pen 2a transmits the position signal in each of the first detection period and the second detection period on the basis of the data.

Next, the processor 43 stores the time-series signals output from each receiver 42 in the first detection period as first received signals (S6), and stores the time-series signals output from each receiver 42 in the second detection period as second received signals (S7). Then, the position signal transmitted by the pen 2a is acquired for each receiver 42 on the basis of the stored first received signals and second received signals (S8).

Here, when the position signal transmitted by the pen 2a in synchronization with the first detection period is $S(t)$, the position signal transmitted by the pen 2a in synchronization with the second detection period is represented as $-S(t)$. In addition, since the first detection period and the second detection period are set such that the phases of the HSYNC noise substantially match each other, when the HSYNC noise generated in the first detection period is $N(t)$, the HSYNC noise generated in the second detection period is also represented as $N(t)$. Then, if these notations are used, the first received signal becomes $N(t)+S(t)$, and the second received signal becomes $N(t)-S(t)$.

At S8, the processor 43 acquires the position signal transmitted by the pen 2a by a method equivalent to the subtraction of the second received signal from the first received signal, that is, the operation of $(N(t)+S(t))-(N(t)-S(t))$. The specific realization method of the operation is not particularly limited and may be performed by, for example, a digital circuit or an analog circuit. As a result of the operation, since the HSYNC noise $N(t)$ is canceled and only the position signal $S(t)$ is left, the processor 43 can acquire only the position signal $S(t)$.

Next, the processor 43 derives the position of the pen 2a on the basis of the reception intensity (amplitude) of the position signal acquired at S8 for each receiver 42 (S9). Specifically, the intensity distribution of the position signal in the touch surface 3a is derived on the basis of the reception intensity of the position signal at each sensor electrode, and the apex of the distribution is acquired as the position of the pen 2a. The processor 43, which has derived the position of the pen 2a, outputs the derived position to the host processor (S10) and terminates the process.

As described above, according to the position detection system 1 of the embodiment, the HSYNC noise can be canceled while leaving the position signal, so that the HSYNC noise can be removed from the received signal without interrupting the input to the receiver 42. Therefore, even in the case where a high-resolution display is used as the display 32, it becomes possible to avoid a decrease in the S/N ratio of the position signal, and as a result, the position of the pen 2a can be detected with high accuracy.

Figure 3:
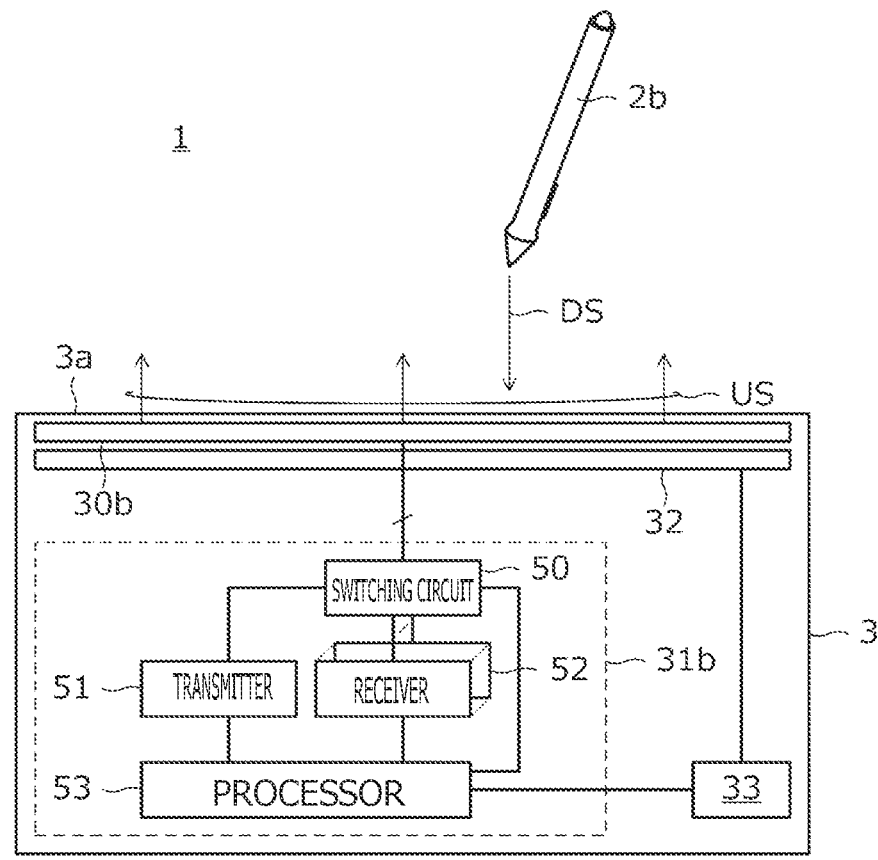
FIG. 3 is a diagram for depicting a configuration of a position detection system 1 according to a second embodiment of the present disclosure.

FIG. 3 is a diagram for depicting a configuration of a position detection system 1 according to a second embodiment of the present disclosure. The position detection system 1 according to the embodiment differs from the position detection system 1 according to the first embodiment in that a pen 2b configured to an electromagnetic induction system is used instead of the pen 2a configured to an active capacitive system, and a sensor 30b and a sensor controller 31b are used instead of the sensor 30a and sensor controller 31a. Since the other points are the same as those of the position detection system 1 according to the first embodiment, the following description focuses on the differences.

The sensor 30b is a device having a structure in which a plurality of loop electrodes is arranged in the touch surface 3a. The plurality of loop electrodes includes a plurality of X electrodes each of which extends in the y direction parallel to the touch surface 3a and is juxtaposed in the x direction perpendicular to the y direction in the touch surface 3a, and a plurality of Y electrodes each of which extends in the x direction and is juxtaposed in the y direction.

The sensor controller 31b is an integrated circuit having a function of detecting the position of the pen 2b in the touch surface 3a. Detection of the position of the pen 2b by the sensor controller 31b is executed by an electromagnetic induction system. Specifically, first, the pen 2b has a resonant circuit including a coil and a capacitor. The sensor controller 31b supplies the uplink signal US, which is an alternating current signal with a frequency equal to the resonant frequency of the resonant circuit in the pen 2b, to one or more of the plurality of loop electrodes configuring the sensor 30b over a certain period. Then, energy is accumulated in the capacitor in the pen 2b by mutual induction between the loop electrodes and the coil in the pen 2b. When the sensor controller 31b finishes the supply of the uplink signal US, the power accumulated in the coil of the pen 2b appears at the loop electrodes by mutual induction. The pen 2b uses this phenomenon to transmit the downlink signal DS.

As similar to the case of the active capacitive system, the downlink signal DS transmitted by the electromagnetic induction system is also a signal that includes a position signal (pen signal) which is an unmodulated carrier signal, and a data signal obtained by modulating the carrier signal with predetermined data such as a pen pressure value or data requested to be transmitted by a command in the uplink signal US. At the stage where the sensor controller 31b has not yet derived the position of the pen 2b, the pen 2b transmits only the position signal as the downlink signal DS. The sensor controller 31b performs a detection process of the downlink signal DS in all the loop electrodes configuring the sensor 30b. Then, the position of the pen 2b is derived on the basis of the reception intensity of the position signal at each loop electrode (global scan). After the sensor controller 31b derives the position of the pen 2b once in this way, the pen 2b sequentially transmits the position signal and the data signal as the downlink signal DS. The sensor controller 31b selects the predetermined number of loop electrodes positioned in the vicinity of the previously-derived position, and performs a detection process of the position signal at the selected loop electrodes. Then, the position of the pen 2b is updated on the basis of the reception intensity of the position signal at each loop electrode (local scan). In addition, the sensor controller 31b selects one loop electrode positioned in the vicinity of the previously-derived position, and performs a detection process of the data signal at the selected loop electrode. Then, the data transmitted by the pen 2b is acquired by demodulating the detected data signal.

As depicted in FIG. 3, the sensor controller 31b has a switching unit 50, a transmitter 51, a plurality of receivers 52, and a processor 53. The switching unit 50 is a functional unit that switches the connection destination of each loop electrode between the transmitter 51 and the plurality of receivers 52 according to the control by the processor 53. The transmitter 51 is a functional unit that supplies the uplink signal US to one or more loop electrodes connected via the switching unit 50 according to the control by the processor 53.

Each of the plurality of receivers 52 is a functional unit that receives the downlink signal DS arriving at the loop electrode (reception electrode) connected via the switching unit 50. Each receiver 52 has a detection circuit that extracts the frequency component of the carrier signal of the downlink signal DS from a change in potential difference that appears at both ends of the connected loop electrode, and is configured to output the signal detected by the detection circuit to processor 53.

The detection circuit in each receiver 52 may be configured by using either an analog circuit or a digital circuit. When configured using a digital circuit, the detection circuit is configured to perform Digital Fourier Transform (DFT) by using a series of digital values (base vectors V sin and V cos to be described later) indicating the carrier signal of the downlink signal DS.

Figure 4:
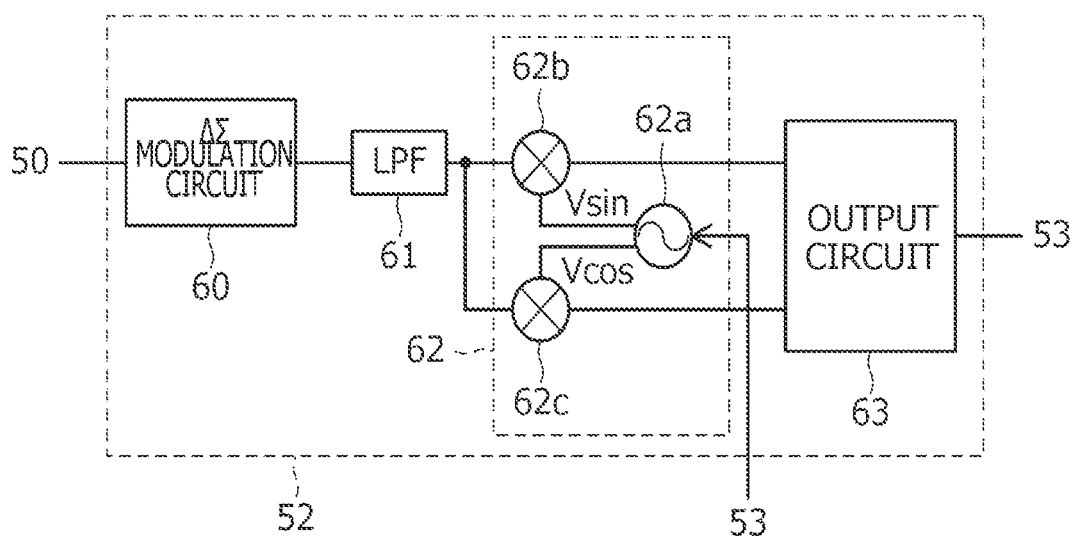
FIG. 4 is a diagram for depicting a specific example of an internal configuration of a receiver 52 depicted in FIG. 3.

FIG. 4 is a diagram for depicting a specific example of an internal configuration of the receiver 52. The drawing depicts an example in which the detection circuit is configured by using a digital circuit. As depicted in the drawing, the receiver 52 in this case has a ΔΣ modulation unit 60, a low-pass filter 61, a detection circuit 62, and an output unit 63. The ΔΣ modulation unit 60 is a circuit that outputs a series of digital values each having a value of 0 or 1 by performing ΔΣ modulation of an analog signal indicated by a change in potential difference appearing at both ends of the loop electrode connected via the switching unit 50. The low-pass filter 61 is a decimation filter that acquires and outputs an addition average by counting (adding) the digital values output by the ΔΣ modulation unit 60 every fixed time. The output signal of the low-pass filter 61 is a digital signal obtained by restoring the analog signal input to the ΔΣ modulation unit 60 by the digital value.

The detection circuit 62 is a circuit that performs frequency analysis of an output signal of the low-pass filter 61 and has an oscillator 62a and mixers 62b and 62c. The oscillator 62a is configured to output two kinds of base vectors V sin and V cos according to the control of the processor 53. The base vector V sin is a vector indicating the sine waveform of the carrier signal of the downlink signal DS and is represented as, for example, {0, +1, 0, −1, 0, +1, 0, −1}. The base vector V cos is a vector indicating the cosine waveform of the carrier signal of the downlink signal DS and is represented as, for example, {+1, 0, −1, 0, +1, 0, −1, 0}. The mixer 62b obtains the convolutional sum (inner product) of the output signal of the low-pass filter 61 and the base vector V sin generated by the oscillator 62a and supplies the result to the output unit 63 as an orthogonal component signal. The mixer 62c obtains the convolutional sum (inner product) of the output signal of the low-pass filter 61 and the base vector V cos generated by the oscillator 62a and supplies the result to the output unit 63 as an in-phase component signal.

The control of the oscillator 62a by the processor 53 is performed to change the phases of the base vectors V sin and V cos supplied from the oscillator 62a to the mixers 62b and 62c in the above-described first detection period and second detection period. Specifically, by delaying the phases of the base vectors V sin and V cos in the second detection period by half a cycle of the carrier signal as compared with the base vectors V sin and V cos in the first detection period, the frequency analysis is executed by the detection circuit 62 in a state where the phases of the base vectors V sin and V cos are inverted in the second detection period. This point will be described in more detail later with reference to FIG. 5.

The output unit 63 is a functional unit that obtains a matching degree vector on the basis of the in-phase component signal and the orthogonal component signal supplied from the detection circuit 62, further obtains the moving average of the length and inclination of the matching degree vector by using a window having a predetermined time length, and sequentially outputs the obtained average value of the length as the reception intensity and the average value of the inclination as the phase to the processor 53 depicted in FIG. 3. The output unit 63 performs a demodulation process to acquire data transmitted by the pen 2b on the basis of the acquired reception intensity and phase, and also performs a process of outputting the data obtained as a result to the processor 53.

The explanation will be made by returning to FIG. 3. As similar to the processor 43 described in the first embodiment, the processor 53 is a functional unit that performs the global scan of the pen 2b and the local scan of the pen 2b, and receives data from the pen 2b through the control of the switching unit 50, the transmitter 51, and each receiver 52. During the local scan process among these processes, the processor 53 executes a process of setting two detection periods in which the HSYNC noise having the same content is expected to occur, causing the pen 2b to transmit the position signal in each period, and canceling the HSYNC noise while leaving the position signal by combining signals indicated by a series of reception intensities supplied from the receiver 52 in the respective periods.

Figure 5:
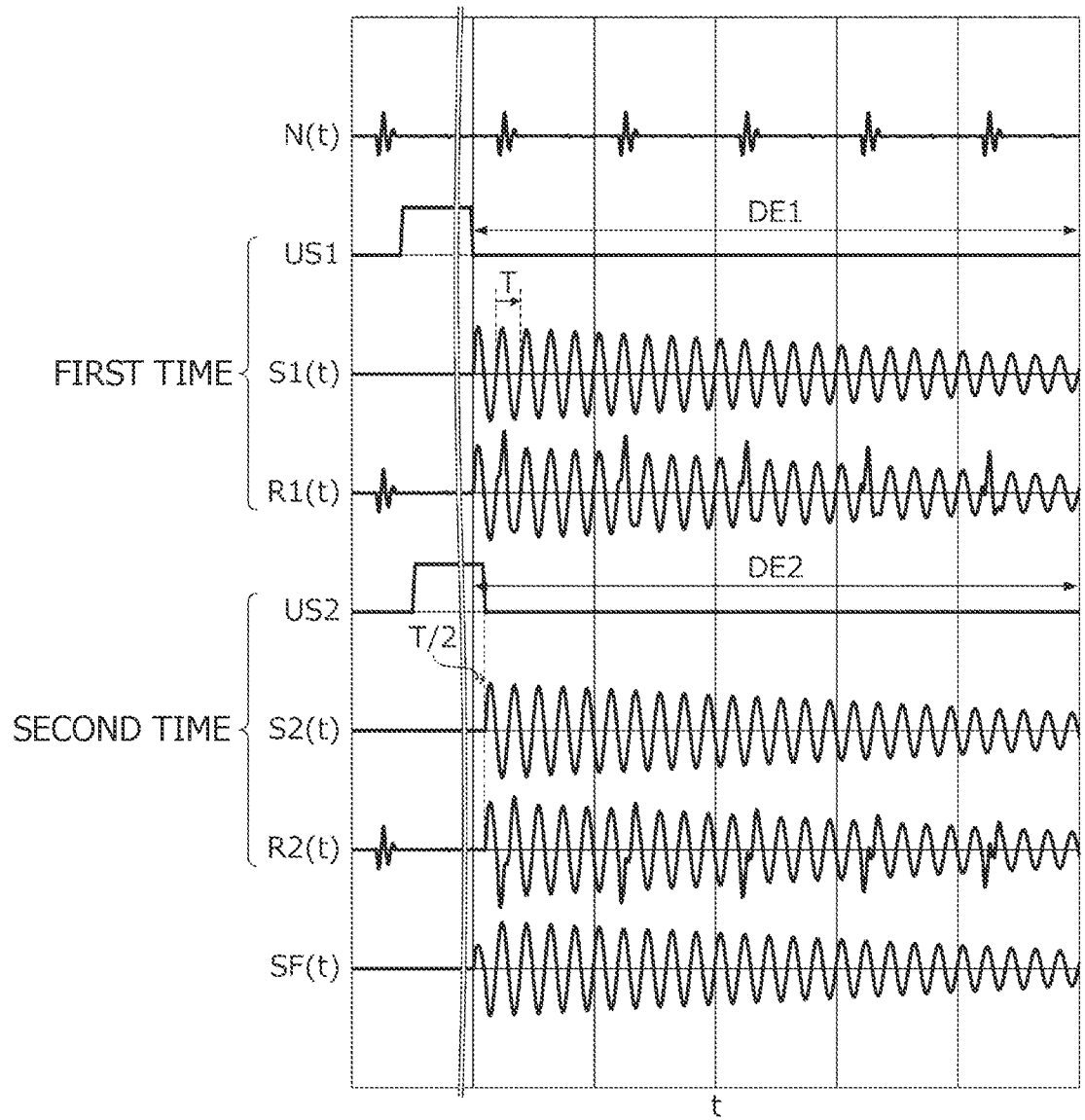
FIG. 5 is a diagram for explaining a combination process of signals executed by a processor 53 depicted in FIG. 3.

FIG. 5 is a diagram for explaining a combination process of signals executed by the processor 53. The horizontal axis in the drawing represents time and the vertical axis represents amplitude, and the drawing depicts the simulated waveforms of the respective signals related to the embodiment. Specifically, the drawing depicts the waveforms of HSYNC noise N(t), a first position signal S1($t$) transmitted from the pen 2b in a first detection period DE1, a first received signal R1($t$) indicated by a series of reception intensities supplied from the receiver 52 to the processor 53 in the first detection period DE1, a second position signal S2($t$) transmitted from the pen 2b in a second detection period DE2, a second received signal R2($t$) indicated by a series of reception intensities supplied from the receiver 52 to the processor 53 in the second detection period DE2, and a position signal SF(t) finally acquired by the processor 53. In addition, FIG. 5 also illustrates a period during which a first uplink signal UP1 corresponding to the first detection period DE1 is transmitted and a period during which a second uplink signal UP2 corresponding to the second detection period DE2 is transmitted.

It should be noted that in FIG. 5, the first detection period DE1 and the second detection period DE2 are depicted at the same position on the time axis for comparison purposes, but the actual second detection period DE2 is the period after the first detection period DE1 ends as described in the first embodiment. In addition, in view of the fact that the first detection period DE1 and the second detection period DE1 are set so that the respective phases of the HSYNC noise substantially match each other, the same HSYNC noise N(t) was used in the first detection period DE1 and the second detection period DE2 to derive the waveform of each signal for convenience in the simulation of the drawing.

The processor 53, which has set the first detection period DE1 and the second detection period DE2, first transmits the first uplink signal UP1 so that the transmission ends at the start timing of the first detection period DEL. Accordingly, the transmission of the first position signal S1($t$) from the pen 2b starts at the start timing of the first detection period DE1 as depicted in FIG. 5. In addition, after the first detection period DE1 ends, the processor 53 transmits the second uplink signal UP2 so that the transmission ends at a timing delayed from the start timing of the second detection period DE2 by a period T/2 half a cycle T of the carrier signal of the downlink signal DS. Accordingly, the transmission of the second position signal S2($t$) from the pen 2b starts at the timing delayed by the period T/2 from the start timing of the second detection period DE2 as depicted in FIG. 5.

In the first detection period DE1, the processor 53 causes the oscillator 62a depicted in FIG. 4 to start outputting the base vectors V sin and V cos according to the start timing of the first detection period DE1. Accordingly, as depicted in FIG. 5, the first received signal R1($t$) supplied from the receiver 52 to the processor 53 becomes a signal having the same phase as the first position signal S1($t$) on which the HSYNC noise N(t) is superimposed. The mathematical formula thereof is expressed as DS1($t$)=N(t)+S1($t$).

In addition, in the second detection period DE2, the processor 53 causes the oscillator 62a depicted in FIG. 4 to start outputting the base vectors V sin and V cos at a timing delayed by the period T/2 from the start timing of the second detection period DE2. This measure is equivalent to delaying the phases of the base vectors V sin and V cos in the second detection period by half a cycle of the carrier signal as compared with the base vectors V sin and V cos in the first detection period. Accordingly, as depicted in FIG. 5, the second received signal R2($t$) supplied from the receiver 52 to the processor 53 becomes a signal whose polarity is inverted as compared with the first received signal R1($t$). The mathematical formula thereof is expressed as DS2($t$) =N(t)+S2($t$)=N(t)−S1($t$).

The processor 53, which has obtained the first received signal R1($t$) and the second received signal R2($t$) as described above, generates the position signal SF(t) by combining them. Specifically, as similar to the first embodiment, the position signal SF(t) is generated by a method equivalent to the subtraction of the second received signal from the first received signal, that is, the operation of (N(t)+S1($t$))−(N(t)−S2($t$)). The specific realization method of the operation is not also particularly limited and may be performed by, for example, a digital circuit or an analog circuit. As a result of the operation, SF(t)=2×S1($t$) is obtained, and thus, as depicted in FIG. 5, only the component of the position signal S1(t) transmitted by the pen 2b is left in the position signal SF(t).

Figure 6:
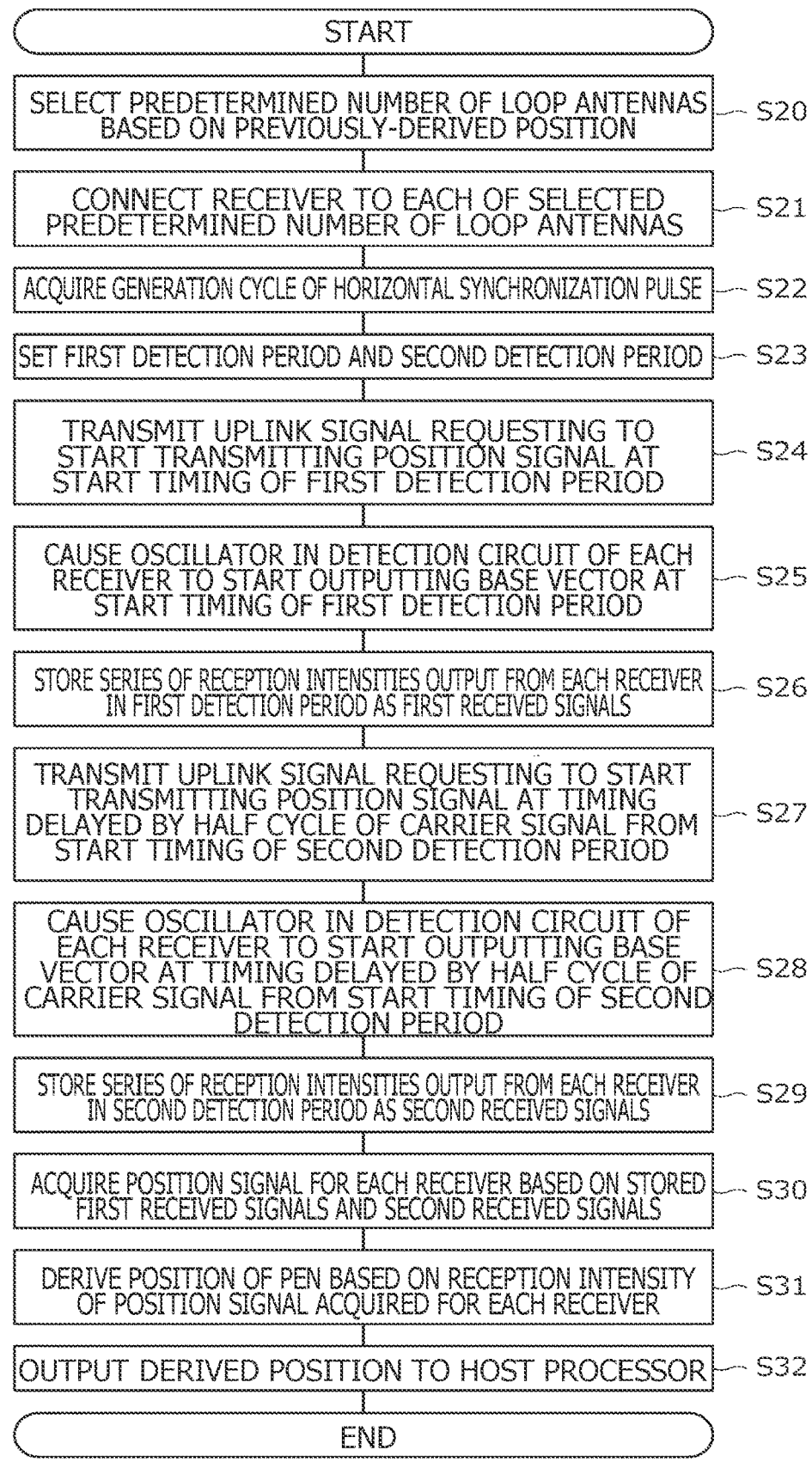
FIG. 6 is a diagram for depicting a processing flow of a local scan executed by the processor 53 depicted in FIG. 3.

FIG. 6 is a diagram for depicting a processing flow of a local scan executed by the processor 53. As depicted in the drawing, the processor 53 first selects the predetermined number of loop electrodes on the basis of the previously-derived position of the pen 2b (S20), and connects the receiver 52 to each of the selected predetermined number of loop electrodes (S21). In Step S20, the processor 53 is configured to select the X-side antennas and the Y-side antennas, the numbers of which are the same, in order from the one nearest to the previously-derived position of the pen 2b. In addition, the predetermined number is equal to or less than the total number of receivers 52, and the respective loop electrodes selected at S1 are connected to the receivers 52 that are different from each other.

Next, the processor 53 acquires the generation cycle of the horizontal synchronization pulse (the generation cycle of the HSYNC noise) from the host processor 33 (S22), and sets a first detection period and a second detection period that is the period after the first detection period ends on the basis of the acquired cycle (S23). A relation between the first detection period and the second detection period thus set is as described in the first embodiment.

Subsequently, the processor 53 transmits the uplink signal US requesting to start transmitting the position signal at the start timing of the first detection period (S24). Specifically, as described with reference to FIG. 5, the uplink signal US is transmitted so that the transmission ends at the start timing of the first detection period. In addition, the processor 53 causes the oscillator 62a in the detection circuit 62 of each receiver 52 to start outputting the base vectors V sin and V cos at the start timing of the first detection period (S25). Then, a series of reception intensities output from each receiver 52 in the first detection period are stored as first received signals (S26).

Next, the processor 53 transmits the uplink signal US requesting to start transmitting the position signal at a timing delayed by half a cycle of the carrier signal from the start timing of the second detection period (S27). Specifically, as described with reference to FIG. 5, the uplink signal US is transmitted so that the transmission ends at a timing delayed by half a cycle of the carrier signal from the start timing of the second detection period. In addition, the processor 53 causes the oscillator 62a in the detection circuit 62 of each receiver 52 to start outputting the base vectors V sin and V cos at a timing delayed by half a cycle of the carrier signal from the start timing of the second detection period (S28). Then, a series of reception intensities output from each receiver 52 in the second detection period are stored as second received signals (S29).

The processor 53, which has acquired the first received signals and the second received signals from each receiver 52 as described above, performs a process of acquiring the position signal on the basis of the stored first received signals and second received signals for each receiver 52 (S30). Specifically, as described above, the position signal is acquired by subtracting the second received signal from the first received signal.

Next, the processor 53 derives the position of the pen 2b on the basis of the reception intensity (amplitude) of the position signal acquired at S30 for each receiver 52 (S31). Specifically, the intensity distribution of the position signal in the touch surface 3a is derived on the basis of the reception intensity of the position signal at each loop electrode, and the apex of the distribution is acquired as the position of the pen 2b. The processor 53, which has derived the position of the pen 2b, outputs the derived position to the host processor (S32) and terminates the process.

As described above, according to even the position detection system 1 of the embodiment, the HSYNC noise can be canceled while leaving the position signal, so that the HSYNC noise can be removed from the received signal without interrupting the input to the receiver 52. Therefore, even in the case where a high-resolution display is used as the display 32, it becomes possible to avoid a decrease in the S/N ratio of the position signal, and as a result, the position of the pen 2b can be detected with high accuracy.

Although the preferred embodiments of the present disclosure have been described above, it is obvious that the present disclosure is not limited to such embodiments in any way, and the present disclosure can be carried out in various modes without departing from the gist thereof.

For example, in the second embodiment, the transmission of the position signal is started by the pen 2b at a timing delayed by half a cycle of the carrier signal from the start timing of the second detection period, and the phases of the base vectors in the second detection period are delayed by half a cycle of the carrier signal as compared with the base vectors in the first detection period, but the transmission of the position signal may be started by the pen 2b at a timing advanced by half a cycle of the carrier signal from the start timing of the second detection period, and the phases of the base vectors in the second detection period may be advanced by half a cycle of the carrier signal as compared with the base vectors in the first detection period.

In addition, in each of the above-described embodiments, the second detection period is defined as the period after the first detection period ends, but the first detection period may be defined as the period after the second detection period ends.

In addition, the sensor controllers 31a and 31b may be configured to be capable of detecting the position of a passive pointer such as a finger. In this case, the sensor 30a can also be used to detect the position of the passive pointer in the first embodiment. On the other hand, the position of the passive pointer can be detected by arranging a sensor configured to a capacitance system while being superimposed on the sensor 30b in the second embodiment.

DESCRIPTION OF REFERENCE SYMBOLS

1: Position detection system
2a: Pen configured to active capacitive system
2b: Pen configured to electromagnetic induction system
3: Electronic apparatus
3a: Touch surface
30a, 30b: Sensor
31a, 31b: Sensor controller
32: Display
33: Host processor
40, 50: Switching unit
41, 51: Transmission unit
42, 52: Reception unit
43, 53: Processing unit
60: ΔΣ modulation unit
61: Low-pass filter
62: Detection circuit
62a: Oscillator
62b, 62c: Mixer
63: Output unit
DE1: First detection period
DE2: Second detection period
DS: Downlink signal R1: First received signal
R2: Second received signal
N: HSYNC noise
S, SF: Position signal
S1: First position signal
S2: Second position signal
T: Cycle of carrier signal of downlink signal DS
US: Uplink signal
US1: First uplink signal
US2: Second uplink signal
V sin, V cos: Base vector The various embodiments described above can be combined to provide further embodiments. All of the U.S. patents, U.S. patent application publications, U.S. patent applications, foreign patents, foreign patent applications and non-patent publications referred to in this specification and/or listed in the Application Data Sheet are incorporated herein by reference, in their entirety. Aspects of the embodiments can be modified, if necessary to employ concepts of the various patents, applications and publications to provide yet further embodiments.

These and other changes can be made to the embodiments in light of the above-detailed description. In general, in the following claims, the terms used should not be construed to limit the claims to the specific embodiments disclosed in the specification and the claims, but should be construed to include all possible embodiments along with the full scope of equivalents to which such claims are entitled. Accordingly, the claims are not limited by the disclosure.

The invention claimed is:

1. A detection method of a pen signal that is an alternating current signal sent from a pen, the method comprising:
   setting a first detection period and a second detection period that is a period after the first detection period ends based on a generation cycle of noise;
   transmitting to the pen a transmission request signal requesting transmission of the pen signal in synchronization with the first detection period and transmission of the pen signal, whose phase is inverted with respect to the pen signal transmitted in synchronization with the first detection period, in synchronization with the second detection period; and
   acquiring the pen signal based on a first received signal received from the pen in the first detection period and a second received signal received from the pen in the second detection period.

2. The detection method of the pen signal according to claim 1, further comprising:
   deriving a position of the pen based on the pen signal acquired by the acquiring for each of a plurality of sensor electrodes or a plurality of loop electrodes.

3. The detection method of the pen signal according to claim 1, wherein:
   the noise is display noise periodically generated by a display, and
   the first detection period and the second detection period are synchronized with a generation cycle of the display noise.

4. The detection method of the pen signal according to claim 3, wherein:
   the noise is horizontal synchronization (HSYNC) noise, and
   the first detection period and the second detection period are each a period having a time length that is a natural number multiple of a cycle of a horizontal synchronization pulse generated in the display.

5. The detection method of the pen signal according to claim 4, wherein the first detection period and the second detection period are set such that phases of the display noise in the respective first and second detection periods substantially match each other.

6. The detection method of the pen signal according to claim 1, wherein the acquiring includes combining the first received signal and the second received signal with each other.

7. The detection method of the pen signal according to claim 6, wherein:
   the pen signal is represented as is $S(t)$, the noise is represented as $N(t)$, the first received signal is represented as $N(t)+S(t)$, and the second received signal is represented as $N(t)-S(t)$, and
   the combining includes acquiring the pen signal by a method equivalent to $(N(t)+S(t))-(N(t)-S(t))$.

8. The detection method of the pen signal according to claim 1, wherein the acquiring includes subtracting the second received signal from the first received signal using an analog circuit or a digital circuit.

9. The detection method of the pen signal according to claim 8, further comprising:
   acquiring the first received signal by performing a detection process of a signal arriving at a reception electrode in the first detection period; and
   acquiring the second received signal by performing a detection process of a signal arriving at the reception electrode in the second detection period such that a polarity of the second received signal is inverted as compared with the first received signal.

10. The detection method of the pen signal according to claim 9, wherein:
    the detection process of the signal arriving at the reception electrode in the second detection period is a process of performing frequency analysis of the signal arriving at the reception electrode in a state where a phase of a base vector is inverted as compared with the detection process of the signal arriving at the reception electrode in the first detection period.

11. The detection method of the pen signal according to claim 9, wherein:
    the transmission request signal requests the pen to start transmitting the pen signal at a timing delayed by half a cycle of a carrier signal of the pen signal from a start timing of the second detection period, and
    the detection process of the signal arriving at the reception electrode in the second detection period is a process of performing frequency analysis of the signal arriving at the reception electrode in a state where a phase of a base vector is delayed by half a cycle of the carrier signal of the pen signal as compared with the detection process of the signal arriving at the reception electrode in the first detection period.

12. A sensor controller for detecting a pen signal that is an alternating current signal sent from a pen, the sensor controller comprising:
    a transmitter that, in operation, supplies a transmission request signal to a sensor;
    a receiver that, in operation, receives a signal arriving at the sensor; and
    a processor that, in operation, controls the transmitter and the receiver,
    wherein the processor, in operation:
       sets a first detection period and a second detection period that is a period after the first detection period ends based on a generation cycle of noise, transmits to the pen, via the transmitter, a transmission request signal requesting transmission of the pen signal in synchronization with the first detection period and transmission of the pen signal, whose phase is inverted with respect to the pen signal transmitted in synchronization with the first detection period, in synchronization with the second detection period, and acquires the pen signal based on a first received signal output from the receiver in the first detection period and a second received signal output from the receiver in the second detection period.

13. A position detection system comprising:

a pen; and a sensor controller that, in operation, a pen signal that is an alternating current signal sent from the pen, wherein, the sensor controller includes:

a transmitter that, in operation, supplies a transmission request signal to a sensor, a receiver that, in operation, receives a signal arriving at the sensor, and a processor that, in operation, controls the transmitter and the receiver, the processor, in operation:

sets a first detection period and a second detection period that is a period after the first detection period ends based on a generation cycle of noise, transmits to the pen, via the transmitter, a transmission request signal requesting transmission of the pen signal in synchronization with the first detection period and transmission of the pen signal, whose phase is inverted with respect to the pen signal transmitted in synchronization with the first detection period, in synchronization with the second detection period, and acquires the pen signal based on a first received signal output from the receiver in the first detection period and a second received signal output from the receiver in the second detection period.

* * * * *